United States Patent [19]
Schwarz

[11] 3,895,502
[45] July 22, 1975

[54] JAW COUPLING

[75] Inventor: Wilhelm Schwarz, Wilhelmshaven, Germany

[73] Assignee: Fried. Krupp Gesellschaft mit beschrankter Haftung, Essen, Germany

[22] Filed: Oct. 19, 1973

[21] Appl. No.: 407,862

[30] Foreign Application Priority Data
Oct. 28, 1972 Germany............................ 2253041

[52] U.S. Cl. .................................................... 64/14
[51] Int. Cl. .............................................. F16d 3/68
[58] Field of Search............... 64/11 R, 9 R, 9 A, 14

[56] References Cited
UNITED STATES PATENTS

| | | | |
|---|---|---|---|
| 1,561,192 | 11/1925 | Spicer et al. ............................ | 64/14 |
| 1,748,146 | 2/1930 | Ricefield ............................. | 64/14 X |
| 2,025,825 | 12/1935 | Ricefield................................ | 64/14 |
| 2,526,799 | 10/1950 | Braswell................................. | 64/14 |
| 2,764,003 | 9/1956 | Croset..................................... | 64/14 |
| 3,729,953 | 5/1973 | Wanzer............................... | 64/14 X |

FOREIGN PATENTS OR APPLICATIONS
264,402   10/1949   Switzerland........................... 64/14

Primary Examiner—Allan D. Herrmann
Attorney, Agent, or Firm—Walter Becker

[57] ABSTRACT

A jaw coupling with elastic power transmitting bodies which are arranged between the jaws of the two coupling sections. The surfaces along which the elastic power transmitting bodies and the jaws engage each other extend at least in those regions in which tangential forces are transmitted at an incline to the axis of rotation of the coupling, while at least one of the coupling sections is axially adjustable relative to the other coupling section.

6 Claims, 12 Drawing Figures

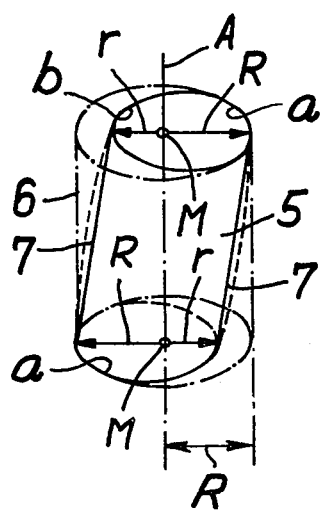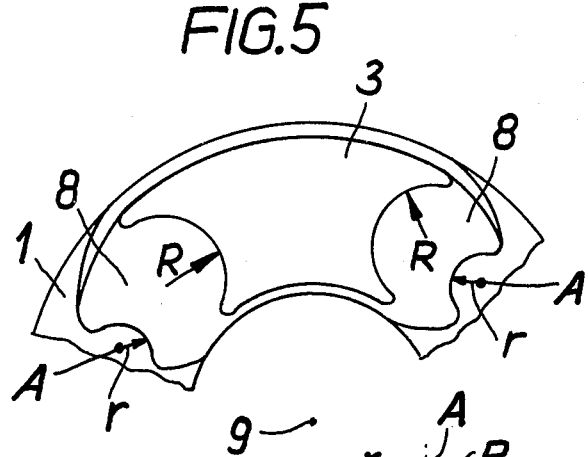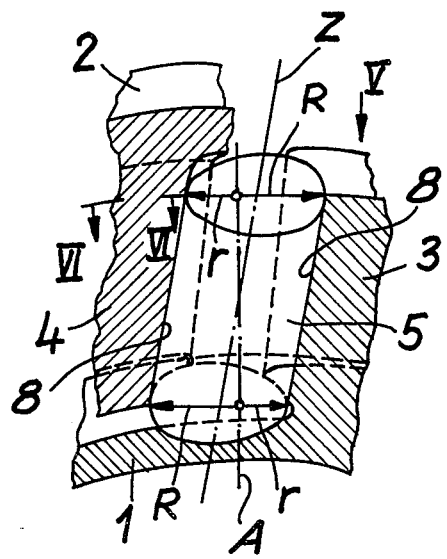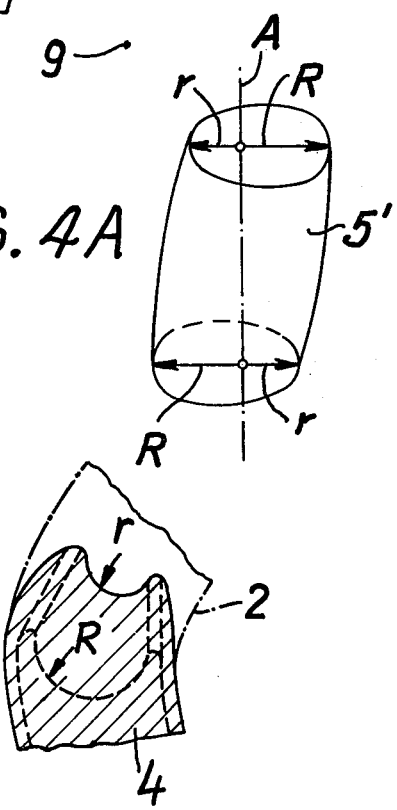

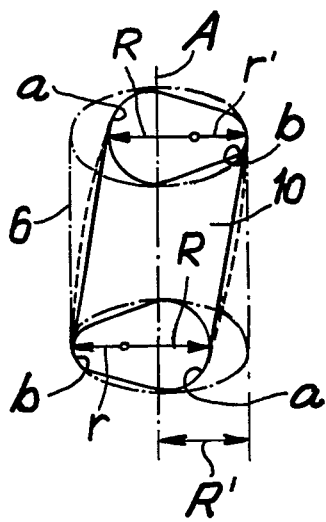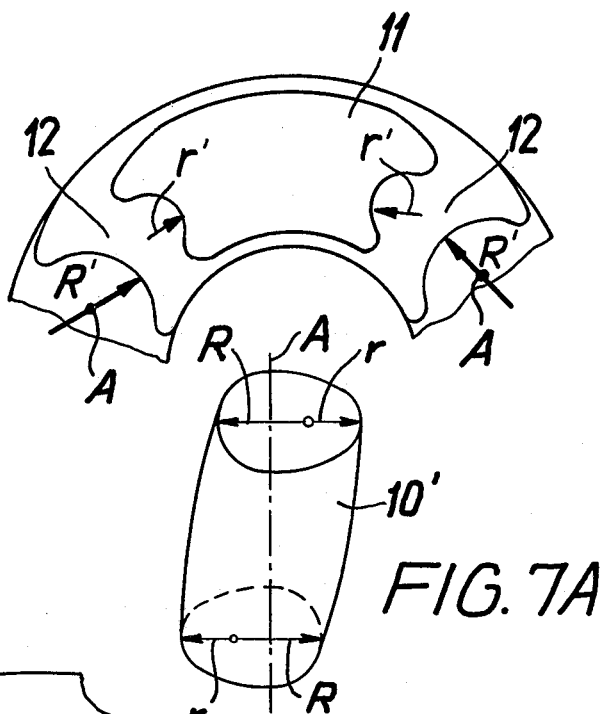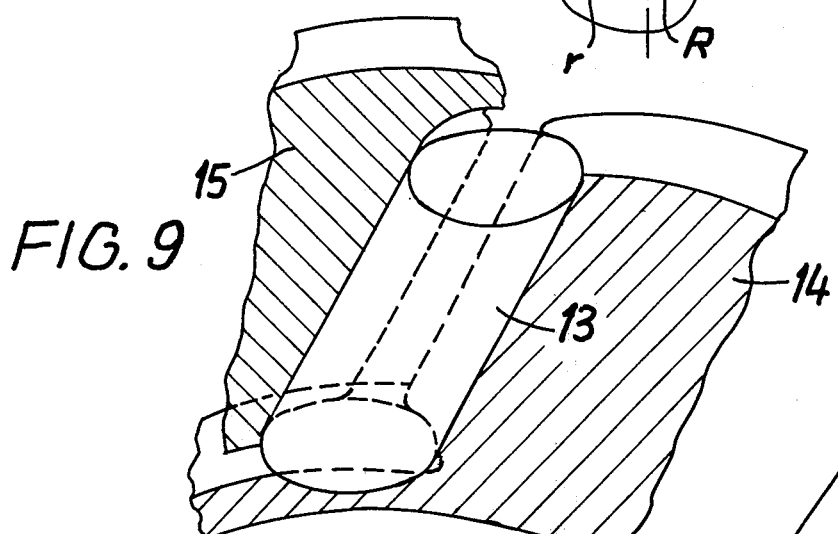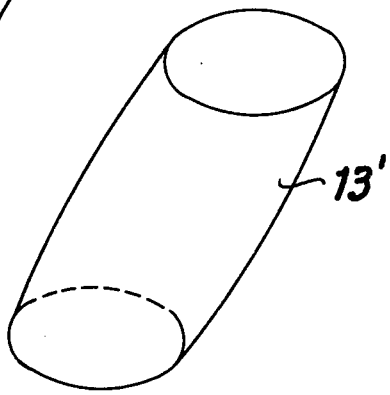

JAW COUPLING

The present invention relates to a jaw coupling with elastic power transmitting bodies between the jaws provided on both coupling sections. By means of these elastic power transmitting members or bodies it is intended to cushion torque shocks, for instance during the starting phase. Heretofore, such elastic bodies, for instance in the form of straight cylinders with circular cross-section, were inserted into cylindrical recesses of the coupling jaws in such an arrangement that the center lines of the elastic bodies were parallel to the axis of rotation of the jaw coupling. In a corresponding arrangement also power transmitting bodies with barrel shaped bulged circumferential surfaces have been utilized.

With jaw couplings of this type, however, it has been found that after a certain period of operation a coupling play of a greater or less magnitude occurs. This is due to the fact that all heretofore known elastic synthetic materials and types of rubber material from which the elastic power transmitting bodies are made have a pressure deformation remainder which depends on the temperature and the stresses acting thereon, in other words, each deformation and subsequent relief is not completely eliminated. The play resulting from this phenomenon during the operation results in harmful stresses of the driving elements following the coupling, for instance a pinion shaft of a transmission. Also, the elastic power transmitting bodies of the coupling are, in view of the play, subjected to unfavorable stresses. It will be appreciated that, due to the play, the rotary oscillations or vibrations brought about by the engine and the shocks are considerably stronger than with couplings which have no play. Experience has shown that with couplings with play, stresses occur which amount to a multiple of the stresses occuring with play-free couplings of the same construction and under the same conditions of operation.

It is, therefore, an object of the present invention to provide a jaw coupling of the above-mentioned general type which will avoid the above-mentioned drawbacks. This object and other objects and advantages of the invention will appear more clearly from the following specification in connection with the accompanying drawings, in which:

FIG. 3 is an isometric section taken along the line III—III of FIG. 2.

FIG. 4 is an isometric view of an elastic power transmitting body for use in connection with the jaw coupling of FIG. 1.

FIG. 5 is a view of a portion of a jaw coupling section as seen in the direction of the Arrow V in FIG. 3.

FIG. 6 represents a section taken along the line VI—VI of FIG. 3.

FIG. 7 is an isometric view of an elastic power transmitting body for use in another embodiment of the present invention.

FIG. 8 illustrates, similar to FIG. 5, a portion of the coupling section for use of a power transmitting body according to FIG. 7.

FIG. 9 represents a section similar to that of FIG. 3 illustrating a portion of a jaw coupling according to still another embodiment of the invention.

FIGS. 4A, 7A, and 9A represent modifications of features in FIGS. 4, 7, and 9 respectively.

FIGS. 10, 11, 12 show each a combination of a jaw coupling and an engine with different means for avoiding axial play within the coupling.

The jaw coupling according to the present invention is characterized primarily in that the surfaces along which the elastic power transmitting bodies and jaws engage each other extend at least within the regions in which tangential forces are transmitted at an incline to the axis of rotation of the coupling, while at least one of the coupling sections is axially adjustable relative to the other coupling section. A coupling of this construction brings about that it can be adjusted with all conditions of operations as they practically occur, and that no play will exist between the elastic power transmitting bodies and the jaws, so that shocks and harmful rotary oscillations or vibrations will be avoided during the operation of the jaw coupling, while also the coupling sections can be produced in a better economic manner.

Figure 1:
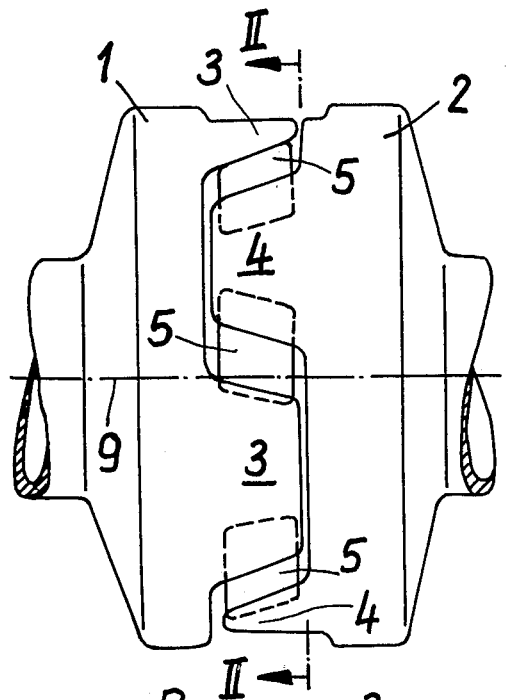
FIG. 1 is a side view of a jaw coupling according to the present invention.
Figure 2:
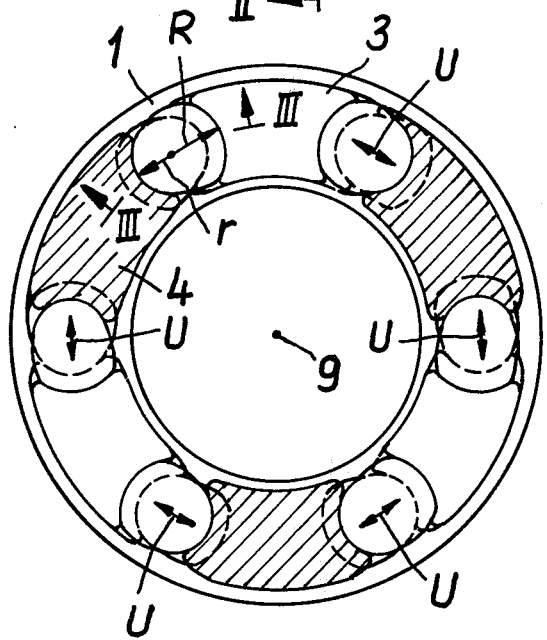
FIG. 2 represents a section taken along the line II—II of FIG. 1.

Referring now to the drawings in detail, the jaw coupling illustrated in FIGS. 1 – 6 has two coupling sections 1, 2, each having three jaws 3, 4.

The elastic power transmitting bodies 5, which are inserted between each two cooperating jaws 3 and 4, have according to FIG. 4 a shape which is derived from a straight cylinder 6 with circular cross-section indicated by dot-dash lines in FIG. 4. The end faces of the power transmitting bodies 5 are oval in such a manner that the circumference of each end face by means of an arc snugly engages a circumference of the cross-section of the cylinder 6, the radius R of curvature of said arc equalling the radius R of the cross-section of cylinder 6. The oval end face on the opposite side has an arc $b$ with a smaller radius of curvature $r$ and is spaced from the circumference of the circular cross-section of the cylinder 6. The two above-mentioned arcs $a$ and $b$ of the circumferential line of each oval end face have a common center point M. These center points M are located on the axis A of the straight cylinder 6. The arrangement is such that the upper end face of the power transmitting body 5 is offset relative to the lower end face by the distance R–r in the direction of the greatest axis of the oval. The mantle surface of the power transmitting body 5 is formed by interconnecting the two end faces by a straight generatrix. Accordingly, on the left hand side of the body with regard to FIG. 4, the radius of curvature of the mantle surface increases from $r$ downwardly to R, whereas on the opposite side, the radius of curvature of the mantle surface decreases from R downwardly to $r$.

The jaws 3, 4 have concave surfaces 8 which are engaged by the power transmitting bodies 5, and more specifically with those regions of its mantle surface in which the radius of curvature continuously changes between $r$ and R. Accordingly, the concave surfaces 8 of the jaws 3, 4 have at the root of each jaw the radius of curvature $r$, and on the outer surface of each jaw have the radius of curvature R.

FIG. 3 illustrates how one of the elastic power transmitting bodies 5 is inserted between two jaws 3, 4 while its mantle surface, with regions located opposite to each other, snugly engages the concave surfaces 8 of the jaws. Since the mantle surfaces in this region extend at an incline with regard to the axis 9 of rotation of the coupling, similar to the center line Z of the body 5, a snug engagement of the concave surfaces 8 with the power transmitting bodies 5 can be realized by displacement of one of the coupling sections 1, 2 relative to the other coupling section, or by displacement of both coupling sections relative to each other. In the above-mentioned regions, the mantle surfaces of the power transmitting bodies 5 and the surfaces 8 of the jaws 3, 4 are so located that the forces which act in tangential direction between the jaws 3 and 4 are transmitted by these surfaces 8.

For instance, in order to obtain a play-free engagement of the elastic power transmitting bodies 5 with the jaws 3, 4, the coupling section 2 may be moved toward the left (with regard to FIG. 10) by pressing toward the left the engine or motor 16 on the shaft 17 of which the coupling section 2 is mounted. However, it is also possible that one of the coupling sections on the pertaining shaft 18 is moved in the direction toward the other coupling section and is secured in this position; see FIG. 11. It is furthermore possible that at least one of the two coupling sections consists of a hub 19 keyed to the pertaining shaft 20 and of a jaw ring 21 which is axially displaceable on said last-mentioned shaft and is adapted to be arrested relative to hub; see FIG. 12.

The displacement of at least one coupling section or a coupling ring for obtaining a play-free engagement of the jaws by the elastic power transmitting bodies may also be realized by means of springs. For example, it is possible that a spring element 22 acts upon the jaw ring 21 which is displaceably mounted on the hub 19, said spring continuously urging said jaw ring in the direction toward the oppositely located clutch section 1.

It is at the discretion of the designer so to select the inclination of the center lines Z of the power transmitting members 5 that the components of the forces to be transmitted between the power transmitting bodies and the jaws, which forces act in axial direction upon the coupling sections 1, 2, without difficulties can be absorbed by the bearings of the shafts which support the coupling sections.

It is also possible to press the coupling sections 1, 2 in axial direction against each other to such an extent that the elastic power transmitting bodies 5 will be preloaded. In such an instance it is necessary that the bearings for the shafts supporting the coupling sections be so dimensioned as to be able to absorb the axial reaction forces during the operation of the coupling.

According to the embodiment illustrated in FIGS. 7 and 8, the shape of the elastic power transmitting bodies 10 is likewise derived from a straight cylinder 6 of circular cross-section. However, the circumference of each of the two end faces of the power transmitting body 10 snugly engages the circular circumference of the respective cross-section with a radius of curvature $r'$, which is shorter than the radius $R'$ of the circular cross-section of the cylinder 6. On the oppositely located side, the end faces of the power transmitting body 10 form arcs, the diameter $R'$ of which equals the radius of the circular cross-section of the cylinder 6, which are spaced from the circumference of the circular cross section. Also with this embodiment, the curvature of the mantle surface of the power transmitting body changes in the oppositely located regions in such a way that the radius of curvature continuously changes between $R'$ and $r'$. Accordingly, the pertaining jaws 11 have concave surfaces 12, the profile of which at the root of the body has the radius of curvature $R'$, and on the outer surface has the radius of curvature $r'$. Also, in this instance, the elastic power transmitting bodies 10 snugly engage the concave surfaces 12 of the jaws 11.

According to the embodiment illustrated in FIG. 9, the elastic power transmitting bodies 13 have the shape of an inclined cylinder of circular cross-section, which snugly engages the corresponding concave surfaces of the jaws 14, 15.

In each instance, the elastic power transmitting bodies, and thus the concave surfaces of the jaws, are so designed that the jaws, above all within the concave surfaces, taper from the root toward the end faces, so that the manufacture by drop forging, pressing, or casting can easily be effected. It is also possible that the respective concave surfaces of the jaws are machined, for instance with conical millers.

The elastic power transmitting bodies may also have bulging barrel shaped mantle surfaces, as indicated by dot-dash lines in FIGS. 4A, 7A and 9A. In this way, the tendency for a snug engagement of the jaws by the power-transmitting bodies will be greatly aided. The power transmitting bodies may consist of any suitable elastic material, for instance rubber material, which has the necessary strength.

It is, of course, to be understood that the present invention is by no means limited to the specific showing in the drawings but also comprises any modifications within the scope of the appended claims.

What I claim is:

1. A rotatable jaw coupling which includes: a first rotatable coupling section, a second rotatable coupling section axially aligned with said first coupling section, each of said two coupling sections having jaws including concave surfaces tapered from roots to end faces thereof as well as facing toward the other coupling sections and each jaw of one coupling section extending between two jaws of the other coupling section and vice versa, elastic power transmitting bodies respectively interposed between each two jaws facing each other and respectively pertaining to said two coupling sections, said elastic power transmitting bodies and said jaws engaging each other along surfaces which at least within regions in which tangential forces are transmitted extend at an incline with regard to the axis of rotation of said coupling, and means associated with said coupling for axially adjusting at least one of said coupling sections relative to the other coupling section.

2. A rotatable jaw coupling which includes: a first rotatable coupling section, a second rotatable coupling section axially aligned with said first coupling section, each of said two coupling sections having jaws facing toward the other coupling sections and each jaw of one coupling section extending between two jaws of the other coupling section and vice versa, elastic power transmitting bodies respectively interposed between each two jaws facing each other and respectively pertaining to said two coupling sections, said elastic power transmitting bodies and said jaws engaging each other along surfaces which at least within regions in which tangential forces are transmitted extend at an incline with regard to the axis of rotation of said coupling, and means associated with said coupling for axially adjusting at least one of said coupling sections relative to the other coupling section, each of said elastic power transmitting bodies being so profiled that its mantle surface by means of which the respective power transmitting body engages the respective adjacent jaws of one of the two coupling sections has its radius of curvature increase from one end face to the other end face, whereas the respective oppositely located mantle surface of the same power transmitting body by means of which it engages a jaw of the other coupling section has a radius of curvature which decreases from said one end face to said other end face.

3. A coupling according to claim 2 in which the centers of curvature along each cross sectional plane pertaining to one and the same elastic power transmitting body and substantially parallel to the end faces of the same power transmitting body for two diametrically oppositely located sides of the mantle surfaces of the same elastic power transmitting body are located on one and the same straight line.

4. A coupling according to claim 2 in which said elastic power transmitting bodies have a barrel-shaped contour.

5. A coupling according to claim 2 which includes a shaft, and in which one of said coupling sections comprises a hub connected to said shaft, a jaw ring displaceably and arrestably arranged on said shaft, and means for arresting said jaw ring on said shaft.

6. A coupling according to claim 5 which includes spring means continuously urging said jaw ring pertaining to said one coupling system in a direction toward the other coupling section.

* * * * *